(12) United States Patent
Sato

(10) Patent No.: US 7,933,082 B2
(45) Date of Patent: Apr. 26, 2011

(54) LENS DEVICE

(75) Inventor: Masumi David Sato, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/691,966

(22) Filed: Jan. 22, 2010

(65) Prior Publication Data

US 2010/0232044 A1    Sep. 16, 2010

(30) Foreign Application Priority Data

Mar. 13, 2009  (JP) ............................... P2009-061600

(51) Int. Cl.
*G02B 7/02* (2006.01)
(52) U.S. Cl. ......... 359/825; 359/811; 359/819; 359/823
(58) Field of Classification Search .......... 359/694–704, 359/811–825

See application file for complete search history.

(56) References Cited

U.S. PATENT DOCUMENTS

| | | | |
|---|---|---|---|
| 5,731,917 A | 3/1998 | Inoue | 359/820 |
| 7,460,319 B2 * | 12/2008 | Aiba et al. | 359/819 |
| 2007/0024989 A1 | 2/2007 | Kageyama | 359/699 |
| 2007/0268596 A1 | 11/2007 | Aiba et al. | |

FOREIGN PATENT DOCUMENTS

| | | |
|---|---|---|
| DE | 103 18 196 | 10/2003 |
| EP | 1 857 850 | 11/2007 |
| JP | 2007-310228 A | 11/2009 |
| WO | WO 00/69167 | 11/2000 |

* cited by examiner

*Primary Examiner* — Mohammed Hasan
(74) *Attorney, Agent, or Firm* — Birch, Stewart, Kolasch & Birch, LLP

(57) ABSTRACT

A monitoring lens device includes a focus ring that is provided in an outer circumferential portion of a fixed cylinder and a zoom ring that is provided in an outer circumferential portion of the focus ring. A screw hole that is engaged with a shaft portion of a lock knob is formed in the focus ring, and an opening portion (long groove) through which the lock knob passes is formed in the zoom ring. A spacer is attached to the lock knob and a convex portion of the spacer is fitted into the opening portion.

10 Claims, 7 Drawing Sheets

LENS DEVICE

CROSS-REFERENCE TO RELATED APPLICATIONS

This application is based on and claims priority under 35 USC 119 from Japanese Patent Application No. 2009-061600 filed on Mar. 13, 2009; the entire of which are incorporated herein by reference.

BACKGROUND

1. Technical Field

The present invention relates to a lens device, and more particularly, to a lens device including a lock mechanism that locks an operating ring, such as a focus ring or a zoom ring, at a desired position and is used for, for example, a monitoring camera.

2. Related Art

In recent years, small monitoring cameras (CCTV monitoring cameras) have come into widespread use in financial institutions and various kinds of stores. In the monitoring lens device used in this type of monitoring camera, a focus ring for adjusting a focus position and a zoom ring for adjusting a focal length are provided in an outer circumferential portion of a barrel (fixed cylinder). For example, when the monitoring camera is installed, an operator manually operates the focus ring and the zoom ring to adjust the focus position and the focal length.

In addition, the monitoring camera is provided on, for example, the wall while being accommodated in a case, and the front surface of a lens device for a monitoring camera faces the outside through an opening formed in the case to capture the outside. Patent Document 1 discloses a lens device for a monitoring camera in which a focus ring is provided on the front side (object side) of an outer circumferential portion of a barrel and a zoom ring is provided in an outer circumferential portion of the focus ring, which enables a user to easily operate the focus ring and the zoom ring through an opening formed in a case (see Patent Document 1 (JP-A-2007-310228 corresponding to US-A-2007/0268596)).

However, the lens device for a monitoring camera disclosed in Patent Document 1 is provided with a lock mechanism that fixes the focus ring and the zoom ring at the adjusted position. According to this structure, a screw hole is formed in the focus ring, and an opening portion is formed in the zoom ring at a position opposite to the screw hole so as to be elongated in a circumferential direction. A lock knob having a flange portion passes through the opening portion of the zoom ring and is engaged with the screw hole of the focus ring. When the lock knob is screwed after the focus ring and the zoom ring are operated to adjust focus and a focal length, the leading end of the lock knob passing through the screw hole of the focus ring comes into contact with the barrel, and the rotational position of the focus ring is fixed. In addition, the flange portion of the lock knob comes into contact with the periphery of the opening portion of the zoom ring, and the zoom ring is pressed against the flange portion and is fixed at the position.

When the focus ring and the zoom ring are locked by the lock mechanism, the flange portion of the lock knob comes lastly into contact with the zoom ring when the lock knob is fully tightened. In this case, when the flange portion comes into contact with the zoom ring with non-uniform pressure due to friction between the flange portion and the zoom ring, the rotating force of the lock knob is likely with the friction to act as the rotating force of the zoom ring. Therefore, when the lock knob is tightened, the zoom ring is displaced from the adjusted position or both the lock knob and the focus ring are displaced from the adjusted position. As a result, the focus position or the focal length deviates from the adjusted position before the rings are locked by the lock knob. In recent years, with an improvement in the image quality of monitoring cameras and an increase in the resolution thereof, focusing or the adjustment of an angle of view has been strictly performed. It is necessary to appropriately prevent deviations from the adjusted position.

SUMMARY

An object of the invention is to provide a lens device that includes a lock mechanism which locks an operating ring for operating a predetermined lens or an aperture diaphragm by the tightening of a lock knob and is capable of preventing a positional deviation when the operating ring is locked.

[1] According to an aspect of the invention, a lens device includes a lock mechanism. The lock mechanism includes: a cylindrical operating ring that operates a position of a movable lens which is provided in an optical system for forming an object image or open/closed positions of an openable stop, the cylindrical operating ring being arranged so as to be rotated relative to an inner member provided therein; a hole that is formed in the operating ring so as to pass through an outer circumferential surface and an inner circumferential surface of the operating ring, the hole being elongated in a circumferential direction; a lock knob that includes a shaft portion having a screw portion that is inserted into the hole and is engaged with a screw hole formed in the inner member, and a knob portion that is held by an operator; and a spacer member that includes a convex portion that is rotatably attached to the shaft portion of the lock knob and can be fitted into the hole at a given rotation position, and a base portion having a seating surface that cannot be fitted into the hole and comes into contact with an outer circumferential surface of a peripheral portion of the hole of the operating ring. The lock knob is rotated to fit the shaft portion into the screw hole of the inner member and the seating surface of the base portion of the spacer member is pressed against the outer circumferential surface of the operating ring, the rotation of the operating ring is regulated and the position of the operating ring is fixed.

[2] According to the lens device of [1], the convex portion of the spacer member may include a front surface that is inserted into the hole of the operating ring. The front surface has a horizontal width substantially equal to a width of the hole of the operating ring and a vertical length more than the width of the hole of the operating ring.

[3] According to the lens device of [1] or [2], the convex portion of the spacer member may include a front surface that is inserted into the hole of the operating ring. A ridgeline between the front surface of the convex portion of the spacer member and a side surface thereof may be rounded or chamfered.

[4] According to the lens device of any one of [1] to [3], the seating surface of the base portion of the spacer member may be formed in a same shape as that of the outer circumferential surface of the operating ring when the seating surface comes into contact with the operating ring.

[5] According to the lens device of any one of [1] to [4], the spacer member may include a hole through which the shaft portion of the lock knob passes, an annular convex portion may be formed on the shaft portion of the lock knob, claws may be formed in the hole of the lock knob so as to protrude inward, and the claws are caught by the annular convex portion to prevent the spacer member from being taken off from the shaft portion of the lock knob.

[6] According to another aspect of the invention, a lens device includes a lock mechanism. The lock mechanism includes: a cylindrical operating ring that operates a position of a movable lens which is provided in an optical system for forming an object image or open/closed positions of an openable stop, the cylindrical operating ring being arranged so as to be rotated relative to an inner member provided therein; a hole that is formed in the operating ring so as to pass through an outer circumferential surface and an inner circumferential surface of the operating ring, the hole being elongated in a circumferential direction; grooves that are provided in the outer circumferential surface of the operating ring in parallel to the hole on both sides of the hole; a lock knob that includes a shaft portion having a screw portion that is engaged with a screw hole formed in the inner member, and a knob portion that is held by an operator; and a pressing member that includes a main body having a hole through which the shaft portion of the lock knob passes and a contact surface which comes into contact with the knob portion of the lock knob, and two legs being fitted into the two grooves and support the main body while the main body is separated from the outer circumferential surface of the operating ring. The rotation of the operating ring is regulated and the position of the operating ring is fixed when (i) the lock knob is rotated to fit the shaft portion into the screw hole of the inner member, (ii) the pressing member is pressed by the knob portion of the lock knob, and (iii) the two legs of the pressing member are pressed against the operating ring.

[7] According to the lens device of [6], the pressing member may include: a plate-shaped main body as the main body; and two plate-shaped legs as the two legs that extend from two opposite sides of the main body in a direction orthogonal to the main body. A leading end of each of the two legs fitted into the groove may have a same shape as the arc-shaped groove.

[8] According to the lens device of any one of [1] to [7], the inner member provided inside the operating ring may be another operating ring that is arranged so as to be rotated relative to a lens barrel. And the rotation of said another operating ring is regulated and a position of said another operating ring is fixed, when (i) the shaft portion of the lock knob is engaged with a screw hole formed in said another operating ring, (ii) the lock knob is rotated to fit the shaft portion into the screw hole of said another operating ring, and (iii) a front surface of the shaft portion comes into pressure contact with the lens barrel.

[9] According to another aspect of the invention, a lens device includes: a cylindrical operating ring that operates a position of a movable lens which is provided in an optical system for forming an object image or open/closed positions of an openable stop, the cylindrical operating ring being arranged so as to be rotated relative to an inner member provided therein; a hole that is formed in the operating ring so as to pass through an outer circumferential surface and an inner circumferential surface of the operating ring, the hole being elongated in a circumferential direction; a lock knob that includes a shaft portion having a screw portion that is inserted into the hole and is engaged with a screw hole formed in the inner member, and a knob portion that is held by an operator; and a spacer member that is attached to the shaft portion of the lock knob between the outer circumferential surface of the operating ring and the knob portion. The spacer member transmits a pressing force from the knob portion to the outer circumferential surface of the operating ring to disable a transmission of a rotating force when the lock knob is rotated to fit the shaft portion into the screw hole of the inner member.

With the configuration of any one of [1] to [9], when the lock knob is tightened to lock the operating ring, the rotating force of the lock knob is not transmitted as force that rotates the operating ring in one direction. Therefore, the operating ring does not deviate from the adjusted position.

DETAILED DESCRIPTION

Hereinafter, a lens device for a monitoring camera according to exemplary embodiments of the invention will be described in detail with reference to the accompanying drawings.

Figure 1:
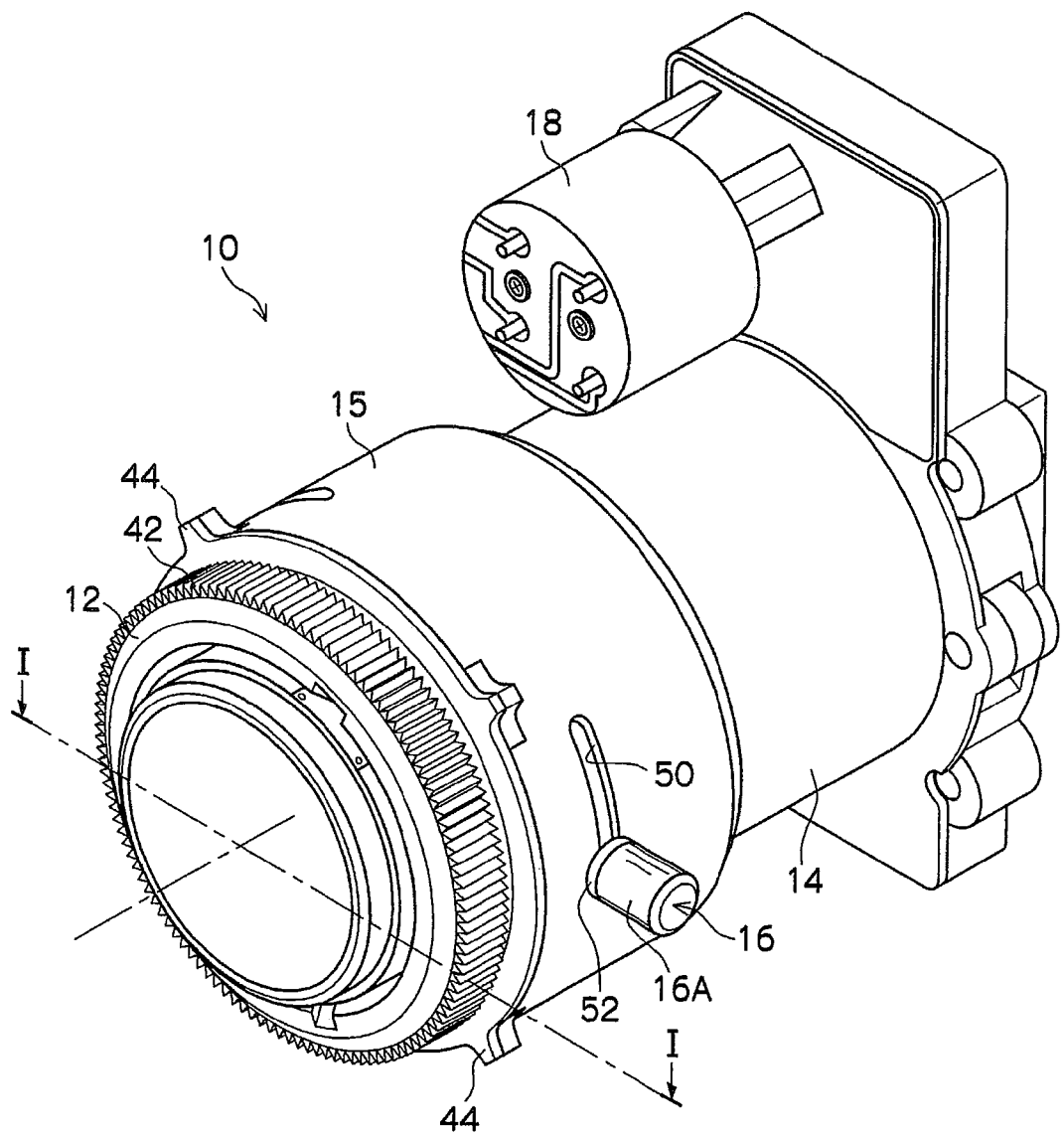
FIG. 1 is a perspective view illustrating the structure of a monitoring lens device according to an embodiment of the invention and a peripheral portion thereof.

FIG. 1 is a perspective view illustrating the structure of a monitoring lens device according to an embodiment of the invention and a peripheral portion thereof. A monitoring lens device 10 shown in FIG. 1 is mainly used in a monitoring camera, and includes a focus ring 12, a zoom ring 14, and a lock knob 16 provided in an outer circumferential portion of a fixed cylinder having a focus lens and a zoom lens supported therein. The monitoring lens device 10 further includes a driving device 18 that drives an infrared filter.

Figure 2:
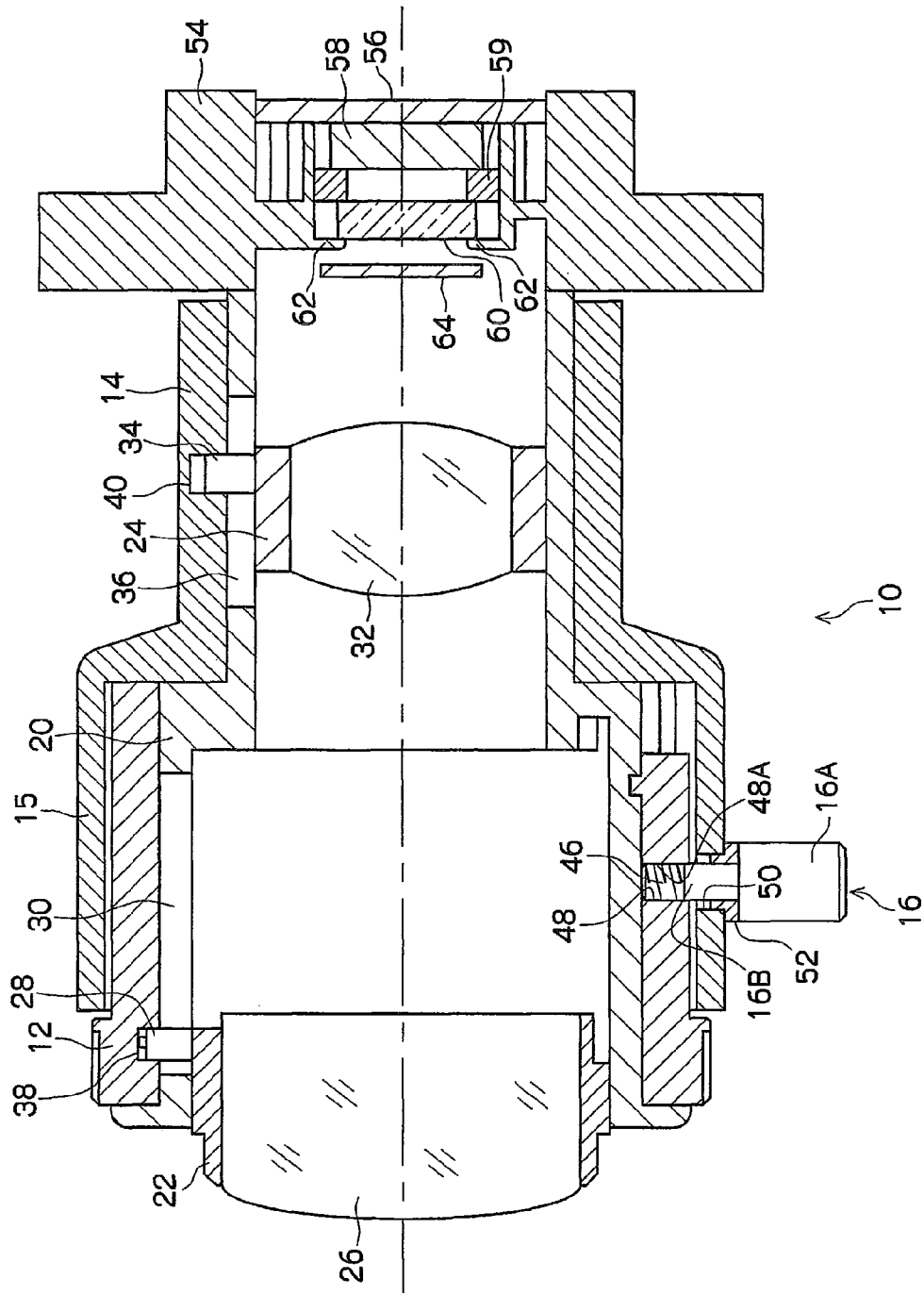
FIG. 2 is a cross-sectional view illustrating the detailed structure of a monitoring lens and shows a cross section along a surface including an optical axis and a one-dot chain line shown in FIG. 1.

FIG. 2 is a cross-sectional view illustrating the detailed structure of a monitoring lens and shows a cross section along a surface including an optical axis and a one-dot chain line shown in FIG. 1. As shown in FIG. 2, the monitoring lens device 10 includes a fixed cylinder 20, and lens frames 22 and 24 are provided in the fixed cylinder 20. The focus ring 12 and the zoom ring 14 are provided outside the fixed cylinder 20.

The lens frame 22 is arranged on the object side (front side) in the fixed cylinder 20 and holds a focus lens (group) 26. The lens frame 22 has an engaging pin 28 protruding from a circumferential surface thereof.

A straight groove 30 is formed in the fixed cylinder 20 in the optical axis direction. The engaging pin 28 is fitted into the straight groove 30 such that the lens frame 22 and the focus lens 26 are moved in a straight line in the optical axis direction while being guided by the straight groove 30.

The lens frame 24 is arranged on the rear side of the lens frame 22 in the fixed cylinder 20. The lens frame 24 holds a zoom lens (group) 32 and has an engaging pin 34 protruding from the circumferential surface thereof. A straight groove 36 is formed in the fixed cylinder 20 in the optical axis direction.

The engaging pin 34 is fitted into the straight groove such that the lens frame 24 and the zoom lens 32 are moved in a straight line in the optical axis direction while being guided by the straight groove 36.

The focus ring 12 is rotatably arranged on the outer circumferential surface of the fixed cylinder 20 at a position where the lens frame 22 is arranged. A cam groove 38 having a spiral shape with respect to the optical axis is formed in the inner circumferential surface of the focus ring 12. The engaging pin 28 provided on the lens frame 22 is engaged with the cam groove 38 of the focus ring 12. Therefore, when the focus ring 12 is rotated, an intersection of the cam groove 38 of the focus ring 12 and the straight groove 30 of the fixed cylinder 20 is displaced in the optical axis direction, and the engaging pin 28, the lens frame 22, and the focus lens 26 are displaced in the optical axis direction with the displacement of the intersection. As such, it is possible to rotate the focus ring 12 to adjust the set position of the focus lens 26, thereby performing focus adjustment (focusing).

The zoom ring 14 is arranged on the outer circumferential surface of the fixed cylinder 20 on the rear side of the focus ring 12 such that it can be rotated. An extending portion 15 extending to the focus ring 12 is provided in the zoom ring 14. The zoom ring 14 has a large inside diameter in the extending portion 15 so as to cover the outer circumference of the focus ring 12. However, a predetermined gap is provided between the inner circumferential surface of the zoom ring 14 and the outer circumferential surface of the focus ring 12 at a position where the extending portion 15 of the zoom ring 14 covers the focus ring 12.

A cam groove 40 having a spiral shape with respect to the optical axis is provided in the inner circumferential surface of the zoom ring 14. The engaging pin 34 provided on the lens frame 24 is engaged with the cam groove 40 of the zoom ring 14. Therefore, when the zoom ring 14 is rotated, an intersection of the cam groove 40 of the zoom ring 14 and the straight groove 36 of the fixed cylinder 20 is displaced in the optical axis direction, and the engaging pin 34, the lens frame 24, and the zoom lens 32 are displaced in the optical axis direction with the displacement of the intersection. As such, it is possible to rotate the zoom ring 14 to adjust the set position of the zoom lens 32, thereby adjusting the focal length (zoom adjustment).

As shown in FIG. 1, an uneven portion 42 is provided on the outer circumference of the leading end of the focus ring 12. In addition, a plurality of claws 44 is provided on the outer circumference of the leading end of the zoom ring 14. Therefore, when the operator holds and rotates the uneven portion 42, the focus ring 12 is rotated. When the operator holds and rotates the claws 44, the zoom ring 14 is rotated.

In the above-mentioned structure, the straight grooves 30 and 36 are provided in the fixed cylinder 20 and the spiral cam grooves 38 and 40 are provided in the focus ring 12 and the zoom ring 14, respectively. However, the spiral cam grooves may be provided in the fixed cylinder 20 and straight cam grooves may be provided in the focus ring 12 or the zoom ring 14. In addition, the spiral cam grooves may be provided in both the fixed cylinder 20 and the focus ring 12 or the zoom ring 14.

In the monitoring lens device 10 according to this embodiment, the focus ring 12 is arranged closer to the object side than the zoom ring 14. However, when the zoom lens 32 is disposed closer to the object side than the focus lens 26, the zoom ring 14 may be provided closer to the object side than the focus ring 12. In this case, an extending portion is provided in the focus ring 12 so as to cover the zoom ring 14.

A lock mechanism is provided in each of the focus ring 12 and the zoom ring 14 in order to fix the ring at a desired adjusted position. The structure of the lock mechanism will be described below. When the lock knob 16 shown in FIGS. 1 and 2 is screwed in a predetermined direction (clockwise direction) until it is hardly rotated, the focus ring 12 and the zoom ring 14 cannot be rotated, and the focus ring 12 and the zoom ring 14 are locked. In this state, when the lock knob 16 is unscrewed in the opposite direction (counterclockwise direction), the focus ring 12 and the zoom ring 14 can be rotated. Therefore, it is possible to perform focus adjustment and zoom adjustment by rotating the focus ring 12 and the zoom ring 14 to desired positions.

As shown in FIG. 2, an imaging device holder 54 is provided at the rear end of the fixed cylinder 20. A substrate 56 is provided on the imaging device holder 54. A CCD (imaging device) 58 is mounted on the substrate 56. A sealing rubber 59 is provided in front of the CCD 58, and a low pass filter (OLPF) 60 is provided in front of the sealing rubber 59. A front portion of the low pass filter 60 comes into contact with a holding portion 62 of the imaging device holder 54. An IR cut filter 64 is provided in front of the low pass filter 60. The IR cut filter 64 includes two filters, that is, a filter that cuts infrared rays and a filter that transmits infrared rays. The driving device 18 switches the two filters of the IR cut filter 64.

Figure 3:
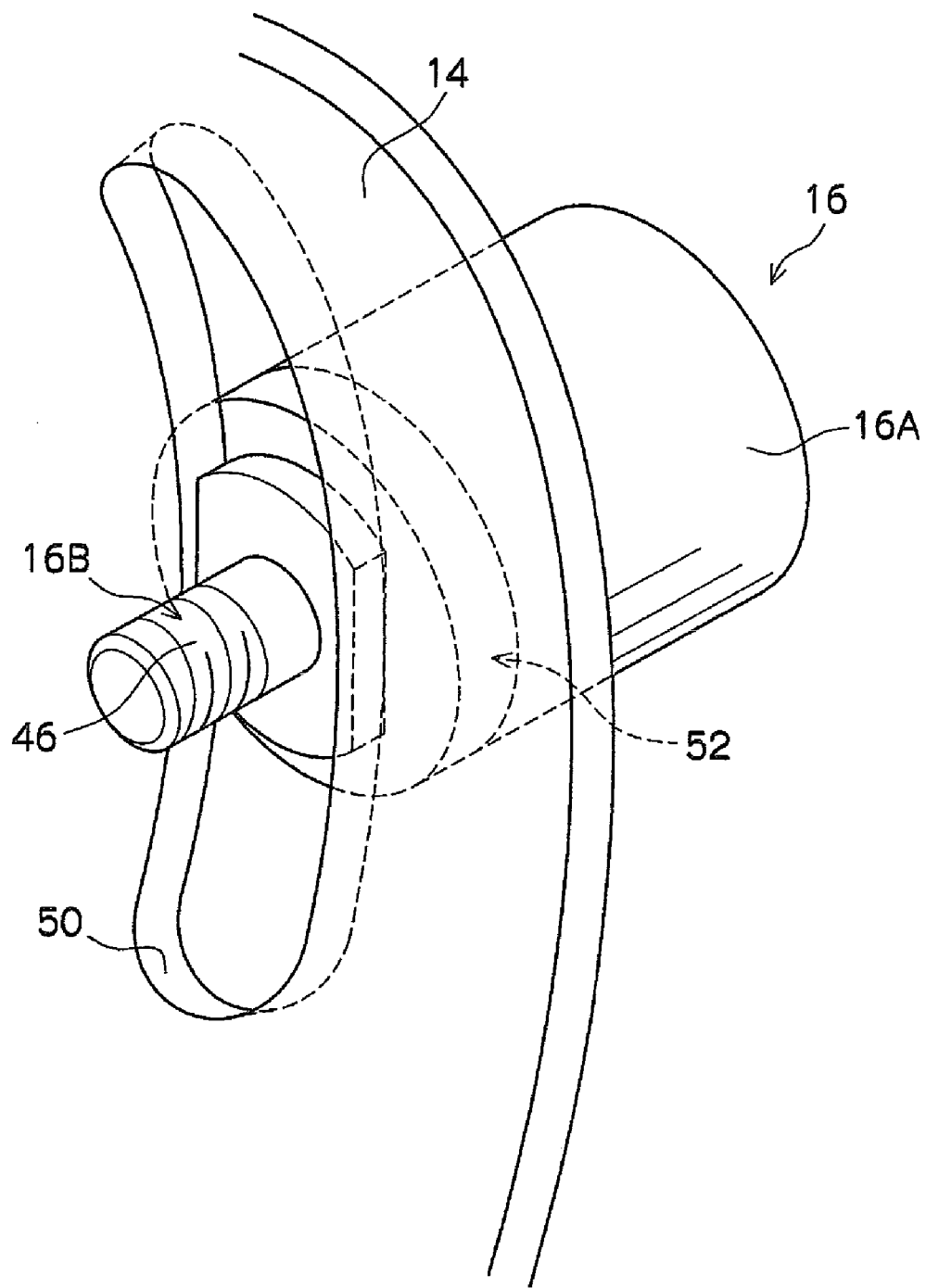
FIG. 3 is a perspective view illustrating a lock knob, as viewed from the inside of a zoom ring.

Next, the structure of the lock mechanism of the focus ring 12 and the zoom ring 14 will be described. As shown in FIGS. 1 and 2, the lock knob 16 is provided on the outer circumferential surface of the zoom ring 14 with a knob portion 16A protruding from the outer circumferential surface. FIG. 3 is a perspective view illustrating the lock knob 16, as viewed from the inside of the zoom ring 14, and FIG. 4 is a side view illustrating only the lock knob 16.

Figure 4:
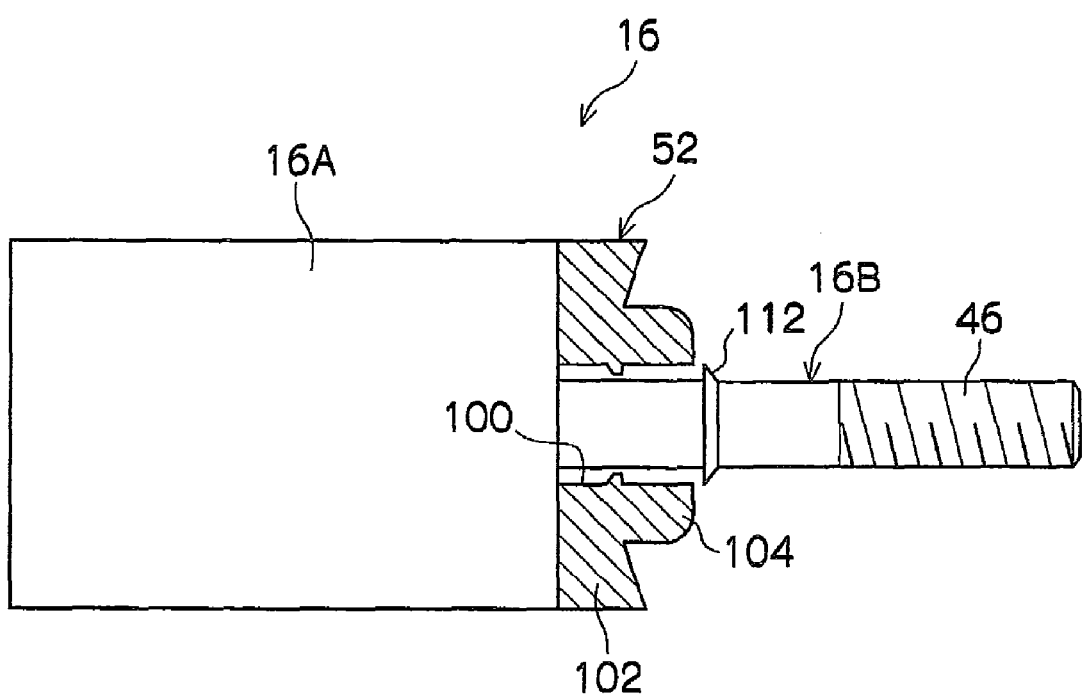
FIG. 4 is a side view illustrating only the lock knob.

As shown in FIGS. 2 to 4, the lock knob 16 includes the knob portion 16A that is rotated by the fingers of the operator and a shaft portion 16B having a male screw 46 formed therein. The male screw 46 is formed on the circumferential surface of the shaft portion 16B at the leading end thereof.

As shown in FIGS. 2 and 3, a hole 48 is formed in the focus ring 12, and a female screw 48A that is engaged with the male screw 46 of the lock knob 16 is formed on the inner circumferential surface of the hole. An opening portion 50 with a width larger than the diameter of the shaft portion 16B is formed in the zoom ring 14 such that the shaft portion 16B of the lock knob 16 is inserted thereinto. As shown in FIGS. 1 and 3, the opening portion 50 is elongated in the circumferential direction (rotation direction) of the zoom ring 14.

The shaft portion 16B is inserted into the opening portion 50 from the outside of the zoom ring 14 and the male screw 46 provided at the leading end of the lock knob 16 is engaged with the female screw 48A of the hole 48 of the focus ring 12. In this way, the lock knob 16 is attached to the focus ring 12.

When the lock knob 16 is rotated in a predetermined direction (clockwise direction) and the shaft portion 16B is fitted into the hole 48 of the focus ring 12, the leading end surface of the shaft portion 16B of the lock knob 16 comes into pressure contact with the outer circumferential surface of the fixed cylinder 20. In this way, the lock knob 16 regulates the rotation of the focus ring 12 with respect to the fixed cylinder 20 such that the focus ring 12 cannot be rotated. Therefore, the position of the focus ring 12 is fixed. In addition, the zoom ring 14 is pressed by a spacer 52, which will be described below, attached to the lock knob 16 such that it cannot be rotated. Therefore, the position of the zoom ring 14 is fixed. That is, when the lock knob 16 is rotated in the clockwise direction, the focus ring 12 and the zoom ring 14 are locked.

When the lock knob 16 is rotated in a direction (counterclockwise direction) opposite to the above-mentioned direction and the leading end surface of the shaft portion 16B is separated from the outer circumferential surface of the fixed cylinder 20, the focus ring 12 and the zoom ring 14 are unlocked such that the focus ring 12 and the zoom ring 14 can be rotated. In this way, it is possible to rotate the focus ring 12 or the zoom ring 14 to perform focus adjustment or zoom adjustment.

The design dimensions, such as the length, of the shaft portion 16B of the lock knob 16 may be adjusted such that one of the focus ring 12 and the zoom ring 14 is completely locked and the other ring can be rotated by an operating force more than a predetermined value, in addition to the structure in which both the focus ring 12 and the zoom ring 14 are completely locked or unlocked.

Next, the spacer 52 attached to the lock knob 16 will be described in detail. As shown in FIGS. 2 to 4, the spacer 52 is made of, for example, plastic (flexible material). The spacer 52 is fitted to the shaft portion 16B of the lock knob 16 and is arranged on a base portion of the shaft portion 16B close to the knob portion 16A. FIGS. 5A, 5B, 5C, and 5D are a front view, a side view, a top view, and a rear view respectively illustrating the spacer 52, as viewed from the leading end of the lock knob 16.

As shown in FIGS. 5A, 5B, 5C, and 5D, the spacer 52 includes a hole 100 which is formed at the center thereof and through which the shaft portion 16B of the lock knob 16 passes, a cylindrical base portion 102 having the hole 100 as the center, and a convex portion 104 that protrudes from the base portion 102.

The hole 100 has a diameter that is slightly larger than that of the shaft portion 16B of the lock knob 16 such that the shaft portion 16B of the lock knob 16 easily passes through the hole 100 of the spacer 52 and the spacer 52 can be attached to the shaft portion 16B.

As shown in FIG. 4, a convex portion 112 having an annular shape is formed in the shaft portion 16B of the lock knob 16. When the shaft portion 16B of the lock knob 16 is inserted into the hole 100 of the spacer 52 and is moved to a position where the rear surface of the spacer 52 comes into contact with the knob portion 16A, the convex portion 112 of the shaft portion 16B of the lock knob 16 contacts the circumference of the front side of the hole 100 of the spacer 52. In this way, the position of the spacer 52 relative to the shaft portion 16B is likely to be maintained.

Figure 5B:
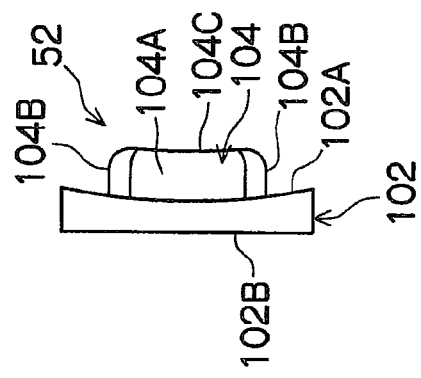
FIGS. 5A, 5B, 5C, and 5D are a front view, a side view, a top view, and a rear view illustrating a spacer, as viewed from the leading end of the lock knob, respectively.
Figure 5D:
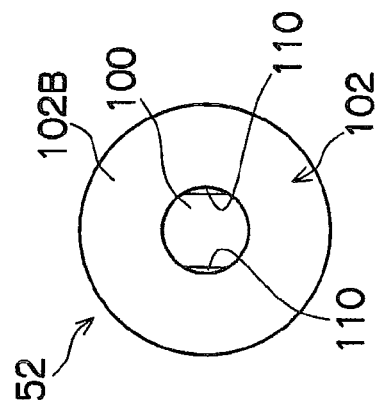
Figure 5A:
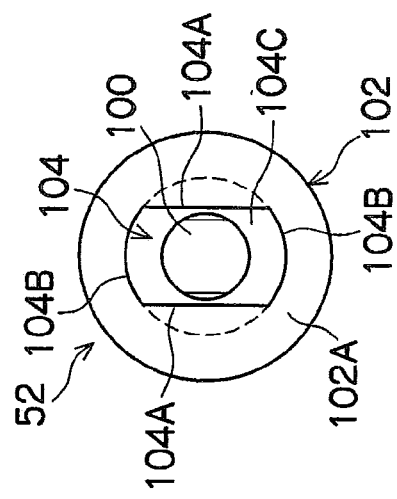
Figure 5C:
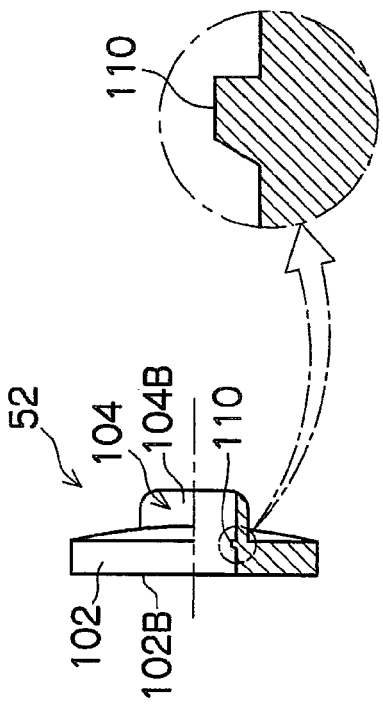

As shown in FIGS. 5C and 5D, two claws 110 are formed in the hole 100 so as to face each other. The claws 110 in the hole 100 of the spacer 52 are caught by the convex portion 112 of the shaft portion 16B shown in FIG. 4. Therefore, the spacer 52 is prevented from being easily taken off from the shaft portion 16B.

In this way, the spacer 52 attached to the lock knob 16 is rotatable with respect to the knob portion 16A or the shaft portion 16B of the lock knob 16.

As shown in FIG. 5B, the base portion 102 includes a rear surface 102B that is flat and a front surface 102A that is a curved surface (cylindrical surface) having a curvature equal to that of the outer circumferential surface of the zoom ring 14 in the circumferential direction. That is, the front surface 102A is formed as a curved surface having a curvature equal to that of the outer circumferential surface of the zoom ring 14 in the circumferential direction such that, when the convex portion 104 of the spacer 52 is fitted into the opening portion 50 of the zoom ring 14 in a predetermined direction (which will be described below) until the front surface 102A of the base portion 102 comes into contact with the outer circumferential surface of the zoom ring 14, as shown in FIG. 3, only a portion of the front surface 102A of the base portion 102 is prevented from coming into contact with the outer circumferential surface of the zoom ring 14. In this way, the entire front surface 102A of the base portion 102 comes into contact with the outer circumferential surface of the zoom ring 14.

As shown in FIG. 5A, the convex portion 104 has an outward appearance in which the left and right sides of a cylinder having an outside diameter smaller than that of the base portion 102 are cut out in a plane shape in the axis direction. The gap between the two side surfaces 104A is substantially equal to (slightly smaller than) the width of the opening portion 50 of the zoom ring 14. In this way, as shown in FIG. 3, the convex portion 104 is fitted into the opening portion 50 with the two side surfaces 104A facing the width direction of the opening portion 50.

In FIG. 5A, a ridgeline between the left and right side surfaces 104A and the front surface 104C of the convex portion 104 and a ridgeline between the upper and lower side surfaces 104B and the front surface 104C are rounded, as shown in FIGS. 5B and 5C. Therefore, the convex portion 104 is easily inserted into the opening portion 50 of the zoom ring 14. That is, the ridgeline between the front surface 104C and the four side surfaces 104A and 104B is rounded.

However, the invention is not limited to the above-mentioned structure in which the ridgeline is rounded, but the ridgeline may be chamfered in a plan view. In the specification, the rounding or chamfering of the ridgeline between the front surface 104C and the four side surfaces 104A and 104B of the convex portion 104 means that the ridgeline is processed in the same shape as that when it is rounded and chamfered. Therefore, the invention is not limited to the structure in which, after the spacer 52 is formed, rounding or chamfering is performed, but the invention also includes a case in which the spacer 52 is formed in the same shape as that when rounding or chamfering is performed. In addition, a method of processing and forming the spacer 52 is not particularly limited.

The convex portion 104 of the spacer 52 is formed such that it can be fitted into the opening portion 50 only when it faces the opening portion 50 of the zoom ring 14 in a specific direction, but the invention is not limited thereto. For example, the convex portion 104 may be formed in a square shape, as viewed from the front side, and the convex portion 104 may be fitted into the opening portion 50 in two directions that intersect each other.

Next, the operation of the spacer 52 of the lock knob 16 having the above-mentioned structure will be described. First, it is assumed that the focus ring 12 and the zoom ring 14 are unlocked and the convex portion 104 of the spacer 52 is taken off from the opening portion 50 of the zoom ring 14. In this case, when the lock knob 16 is rotated in the clockwise direction, the spacer 52 is rotated together with the shaft portion 16B of the lock knob 16. When the shaft portion 16B is fitted into the hole 48 of the focus ring 12, the spacer 52 gradually approaches the zoom ring 14 and the opening portion 50. When the front surface 104C of the convex portion 104 of the spacer 52 comes into contact with the zoom ring 14, the shaft portion 16B is aligned in a direction in which it can be inserted into the opening portion 50 (see FIG. 3) and the rotation of the lock knob stops against the rotation of the shaft portion 16B. When the lock knob 16 is further rotated, the convex portion 104 of the spacer 52 is inserted into the opening portion 50 while maintaining its posture (direction).

Then, the front surface 102A of the base portion 102 of the spacer 52 comes into contact with the outer circumferential surface of the zoom ring 14. When the lock knob 16 cannot be rotated in the clockwise direction, the focus ring 12 and the zoom ring 14 are locked.

According to this structure, when the position adjustment (focus adjustment and focal length adjustment) of the focus ring 12 and the zoom ring 14 is completed and the lock knob 16 is rotated to lock the focus ring 12 and the zoom ring 14, the rotating force is not transmitted as the rotating force of the focus ring 12 or the zoom ring 14. That is, when only a portion of an arbitrary member that is rotated together with the lock knob 16 comes into contact with the outer circumferential surface of the zoom ring 14, force that rotates the zoom ring 14 in one direction is transmitted, which may cause a positional deviation from the adjusted position.

As described above, when the convex portion 104 of the spacer 52 is fitted into the opening portion 50, the rotating force of the lock knob 16 is transmitted as force that rotates the zoom ring 14 on the lock knob 16. However, the zoom ring 14 is not rotated since the rotation is regulated. Therefore, the positional deviation of the zoom ring 14 from the adjusted position due to the rotation of the lock knob 16 is prevented. When a monitoring camera including the monitoring lens device 10 according to this embodiment is installed in a predetermined place and the focus and focal length of the monitoring camera are adjusted, it is possible to improve the efficiency of the adjustment operation and reduce the effort and time required for the operation. In addition, it is possible to improve the quality of an image captured by the monitoring camera.

Figure 6:
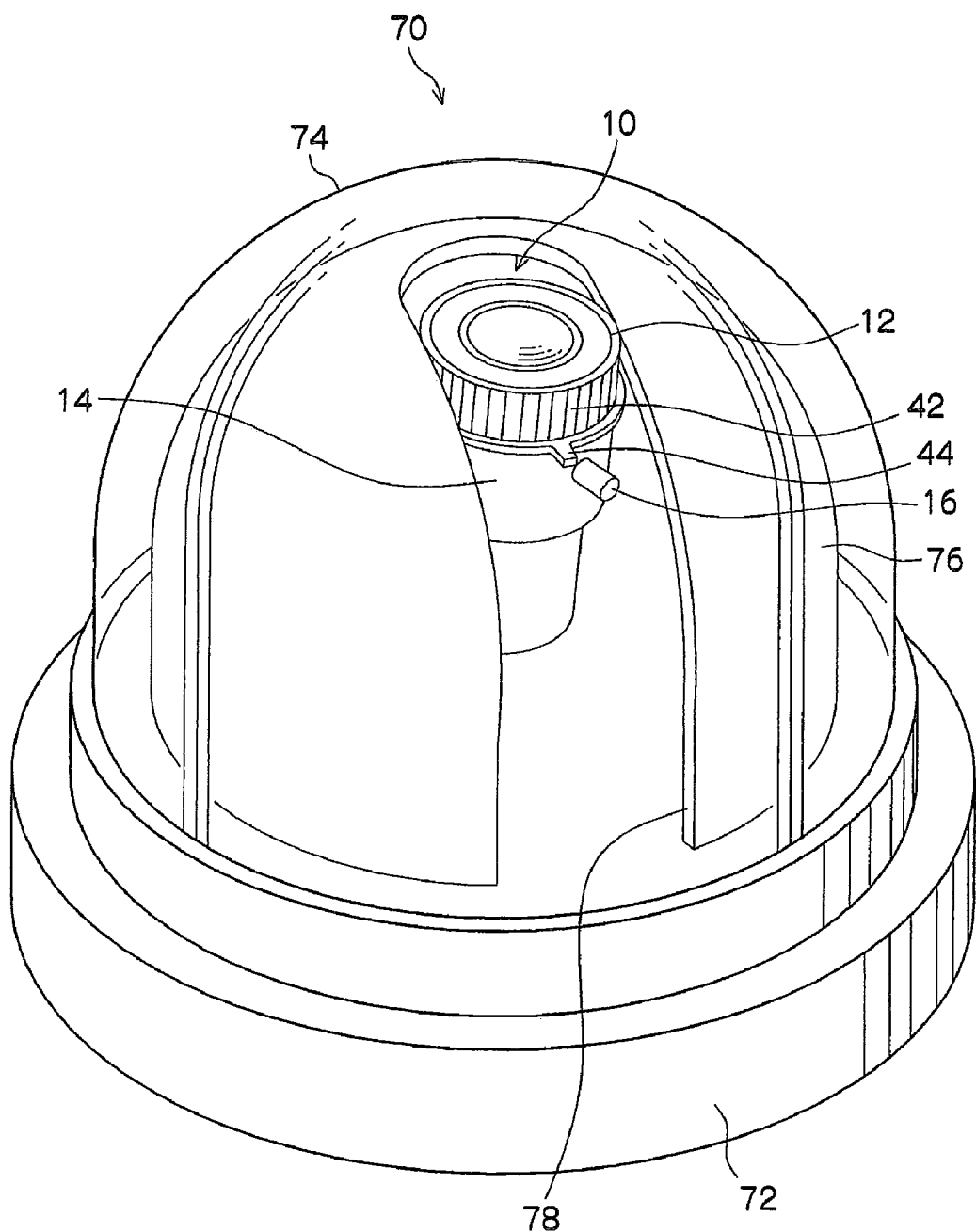
FIG. 6 is a diagram schematically illustrating a small monitoring camera including the monitoring lens device according to the embodiment.

FIG. 6 is a diagram schematically illustrating a small monitoring camera 70 including the monitoring lens device 10 according to the embodiment. The monitoring camera 70 shown in FIG. 6 has a dome shape in appearance, and includes a base 72, a transparent case member 74, and a cover member 76 that is provided in the case member 74 and covers the monitoring lens device 10. An opening 78 corresponding to the leading end of the monitoring lens device 10 is provided in the cover member 76. The angle of the monitoring lens device 10 with respect to the base 72 may be changed and the monitoring lens device 10 may be rotated with respect to the base 72, which is not shown in the drawings.

In the monitoring lens device 10 according to this embodiment, the extending portion 15 is provided in the zoom ring 14 and the front portion of the zoom ring 14 extends so as to cover the focus ring 12. Therefore, it is possible to arrange an operating portion (uneven portion 42) of the focus ring 12 and an operating portion (claws 44) of the zoom ring 14 so as to be close to each other. It is possible to arrange the operating portion of the focus ring 12 and the operating portion of the zoom ring 14 in the vicinity of the leading end of the monitoring lens device 10. It is possible to operate both the focus ring 12 and the zoom ring 14 in the vicinity of the leading end of the monitoring lens device 10. In this way, when operating the focus ring 12 and the zoom ring 14, it is not necessary to insert the end of the finger to the rear side of the monitoring lens device 10. Therefore, as shown in FIG. 6, if the monitoring lens device 10 is provided in the small monitoring camera 70, it is possible to easily operate the focus ring 12 and the zoom ring 14 even when the opening 78 of the cover member 76 is very small.

One lock knob 16 is used to lock the focus ring 12 and the zoom ring 14 and is provided on the front side of the monitoring lens device 10. Therefore, it is possible to operate the lock knob 16 easily and conveniently. In addition, since the spacer 52 that hardly generates positional deviation is used, it is possible to easily and appropriately fix the focus ring 12 and the zoom ring 14 to the adjusted position.

In the above-described embodiment, the spacer 52 shown in FIGS. 2 to 5D is attached to the lock knob 16 of the lock mechanism to prevent the positional deviation of the focus ring 12 and the zoom ring 14 from the adjusted position during the locking of the lock knob 16. However, the spacer 52 may be attached to the shaft portion 16B of the lock knob 16 between the outer circumferential surface of the zoom ring 14 and the knob portion 16A of the lock knob 16. In this case, when the lock knob 16 is rotated to fit the shaft portion 16B into the hole 48 of the focus ring 12, pressing force is transmitted from the knob portion 16A to the outer circumferential surface of the zoom ring 14 such that the rotating force is not transmitted. For example, a structure shown in FIG. 7 may be used instead of the spacer 52.

Figure 7:
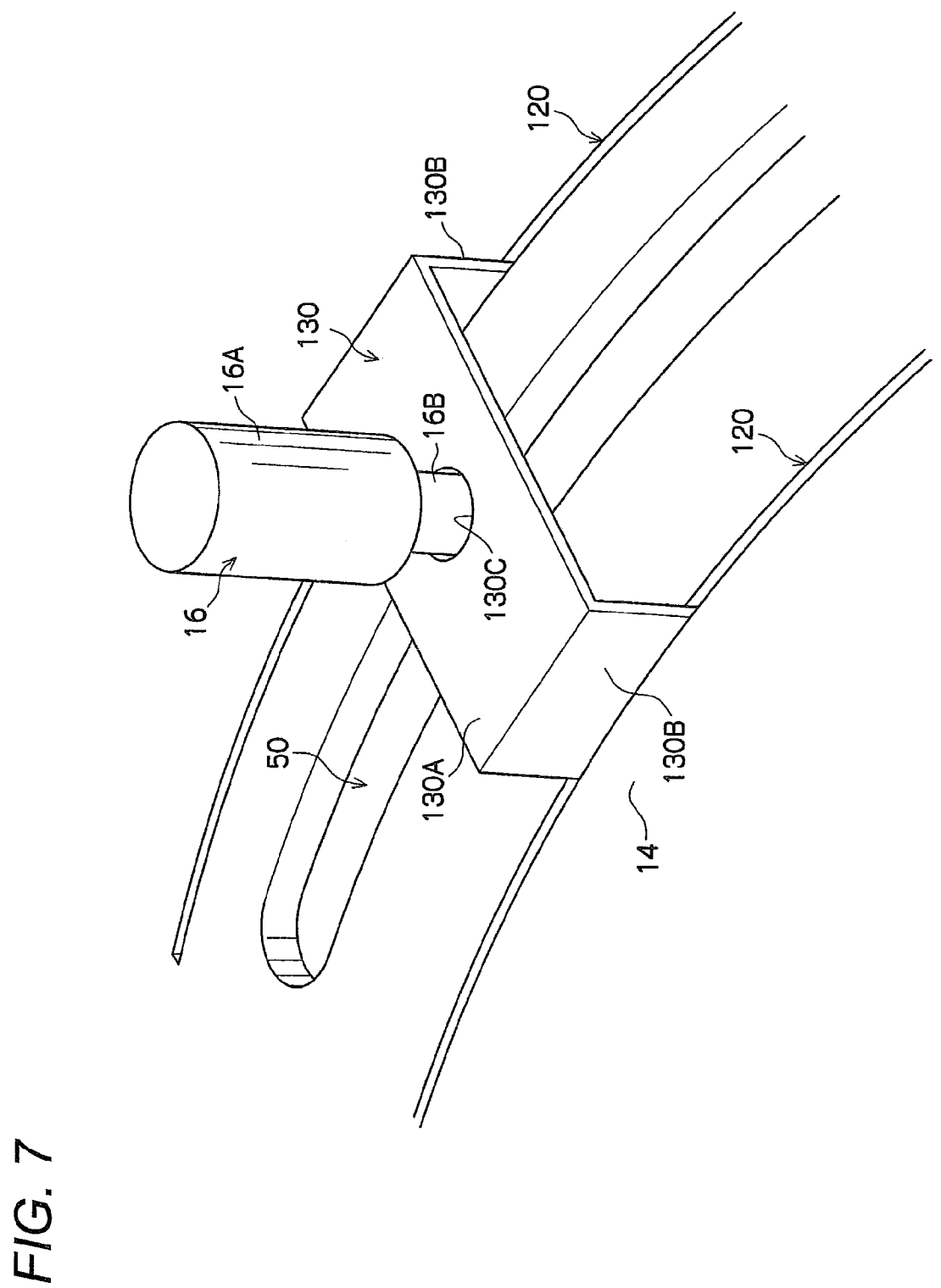
FIG. 7 is a perspective view illustrating a lock mechanism that locks a focus ring and a zoom ring according to another embodiment.

According to the structure shown in FIG. 7, grooves 120 are formed on both sides of the opening portion 50 along the direction in which the opening portion 50 of the zoom ring 14 extends. A U-shaped pressing member 130 including a main body 130A and two legs 130B is provided, and the leading ends of the legs 130B are fitted into the corresponding grooves 120. The pressing member 130 may be integrally made of, for example, plastic or metal, such as sheet metal. In addition, the pressing member 130 may not be integrally formed.

The shaft portion 16B of the lock knob 16 (the knob portion 16A and the shaft portion 16B) having the same structure as that shown in FIG. 4 passes through a hole 130C that is formed at the center of the main body 130A of the pressing member 130, and the shaft portion 16B is inserted into the opening portion 50 and the zoom ring 14 and is engaged with the female screw 48A of the hole 48 of the focus ring 12, similar to the structure shown in FIGS. 2 and 3. When the lock knob 16 is inserted with the legs 130B of the pressing member 130 fitted into the grooves 120, the knob portion 16A of the lock knob 16 presses the main body 130A of the pressing member 130 to the outer circumferential surface of the zoom ring 12, and the zoom focus ring 12 and the zoom ring 14 are locked.

According to the above-mentioned structure, the rotating force of the lock knob 16 is not transmitted as the rotating force of the focus ring 12 and the zoom ring 14, and it is possible to lock the focus ring 12 and the zoom ring 14 without a deviation in the positions of the focus ring 12 and the zoom ring 14 adjusted in an unlocked state.

In the above-described embodiment, the invention is applied to the monitoring lens device, but the invention is not limited to the monitoring lens device. For example, the invention may be applied to lens devices having a lock mechanism that locks an operating ring.

In the above-described embodiment, two operating rings overlap each other, but the invention is not limited thereto. When an operating ring having the same opening portion 50 as the zoom ring 14 is provided in a predetermined outer circumferential portion of a barrel so as not to overlap another operating ring, the operating ring may be applied to a lock mechanism in which the screw of the shaft portion of the lock knob is inserted into the opening portion 50 and is engaged with a screw hole provided in the barrel, thereby locking the operating ring with the lock knob. The operating ring according to the invention may be an operating ring that moves movable lenses other than a focus lens or a zoom lens or an operating ring that opens or closes an iris (aperture diaphragm).

What is claimed is:

1. A lens device comprising:
a lock mechanism,
wherein the lock mechanism includes:
a cylindrical operating ring that operates a position of a movable lens which is provided in an optical system for forming an object image or open/closed positions of an openable stop, the cylindrical operating ring being arranged so as to be rotated relative to an inner member provided therein;
a hole that is formed in the operating ring so as to pass through an outer circumferential surface and an inner circumferential surface of the operating ring, the hole being elongated in a circumferential direction;
a lock knob that includes
a shaft portion having a screw portion that is inserted into the hole and is engaged with a screw hole formed in the inner member, and
a knob portion that is held by an operator; and
a spacer member that includes
a convex portion that is rotatably attached to the shaft portion of the lock knob and can be fitted into the hole at a given rotation position, and
a base portion having a seating surface that cannot be fitted into the hole and comes into contact with an outer circumferential surface of a peripheral portion of the hole of the operating ring, and
wherein, when the lock knob is rotated to fit the shaft portion into the screw hole of the inner member and the seating surface of the base portion of the spacer member is pressed against the outer circumferential surface of the operating ring, the rotation of the operating ring is regulated and the position of the operating ring is fixed.

2. The lens device according to claim 1,
wherein the convex portion of the spacer member includes a front surface that is inserted into the hole of the operating ring, and
the front surface has a horizontal width substantially equal to a width of the hole of the operating ring and a vertical length more than the width of the hole of the operating ring.

3. The lens device according to claim 1,
wherein the convex portion of the spacer member includes a front surface that is inserted into the hole of the operating ring, and
a ridgeline between the front surface of the convex portion of the spacer member and a side surface thereof is rounded or chamfered.

4. The lens device according to claim 1,
wherein the seating surface of the base portion of the spacer member is formed in a same shape as that of the outer circumferential surface of the operating ring when the seating surface comes into contact with the operating ring.

5. The lens device according to claim 1,
wherein the spacer member includes a hole through which the shaft portion of the lock knob passes,
an annular convex portion is formed on the shaft portion of the lock knob,
claws are formed in the hole of the lock knob so as to protrude inward, and
the claws are caught by the annular convex portion to prevent the spacer member from being taken off from the shaft portion of the lock knob.

6. The lens device according to claim 1,
wherein the inner member provided inside the operating ring is another operating ring that is arranged so as to be rotated relative to a lens barrel, and
the rotation of said another operating ring is regulated and a position of said another operating ring is fixed, when (i) the shaft portion of the lock knob is engaged with a screw hole formed in said another operating ring, (ii) the lock knob is rotated to fit the shaft portion into the screw hole of said another operating ring, and (iii) a front surface of the shaft portion comes into pressure contact with the lens barrel.

7. A lens device comprising:
a lock mechanism,
wherein the lock mechanism includes:
a cylindrical operating ring that operates a position of a movable lens which is provided in an optical system for forming an object image or open/closed positions of an openable stop, the cylindrical operating ring being arranged so as to be rotated relative to an inner member provided therein;
a hole that is formed in the operating ring so as to pass through an outer circumferential surface and an inner circumferential surface of the operating ring, the hole being elongated in a circumferential direction;
grooves that are provided in the outer circumferential surface of the operating ring in parallel to the hole on both sides of the hole;
a lock knob that includes
a shaft portion having a screw portion that is engaged with a screw hole formed in the inner member, and
a knob portion that is held by an operator; and
a pressing member that includes
a main body having a hole through which the shaft portion of the lock knob passes and a contact surface which comes into contact with the knob portion of the lock knob, and
two legs being fitted into the two grooves and support the main body while the main body is separated from the outer circumferential surface of the operating ring, and
wherein the rotation of the operating ring is regulated and the position of the operating ring is fixed when (i) the lock knob is rotated to fit the shaft portion into the screw hole of the inner member, (ii) the pressing member is pressed by the knob portion of the lock knob, and (iii) the two legs of the pressing member are pressed against the operating ring.

8. The lens device according to claim 7,
wherein the pressing member includes:
a plate-shaped main body as the main body; and
two plate-shaped legs as the two legs that extend from two opposite sides of the main body in a direction orthogonal to the main body, and
a leading end of each of the two legs fitted into the groove has a same shape as the arc-shaped groove.

9. The lens device according to claim 7,
wherein the inner member provided inside the operating ring is another operating ring that is arranged so as to be rotated relative to a lens barrel, and
the rotation of said another operating ring is regulated and a position of said another operating ring is fixed, when (i) the shaft portion of the lock knob is engaged with a screw hole formed in said another operating ring, (ii) the lock knob is rotated to fit the shaft portion into the screw hole of said another operating ring, and (iii) a front surface of the shaft portion comes into pressure contact with the lens barrel.

10. A lens device comprising:

a cylindrical operating ring that operates a position of a movable lens which is provided in an optical system for forming an object image or open/closed positions of an openable stop, the cylindrical operating ring being arranged so as to be rotated relative to an inner member provided therein;

a hole that is formed in the operating ring so as to pass through an outer circumferential surface and an inner circumferential surface of the operating ring, the hole being elongated in a circumferential direction;

a lock knob that includes a shaft portion having a screw portion that is inserted into the hole and is engaged with a screw hole formed in the inner member, and a knob portion that is held by an operator; and a spacer member that is attached to the shaft portion of the lock knob between the outer circumferential surface of the operating ring and the knob portion, and wherein the spacer member transmits a pressing force from the knob portion to the outer circumferential surface of the operating ring to disable a transmission of a rotating force when the lock knob is rotated to fit the shaft portion into the screw hole of the inner member.

* * * * *